March 6, 1951 E. LEWIS 2,543,916
POULTRY FEEDER
Filed Aug. 31, 1945 2 Sheets-Sheet 1
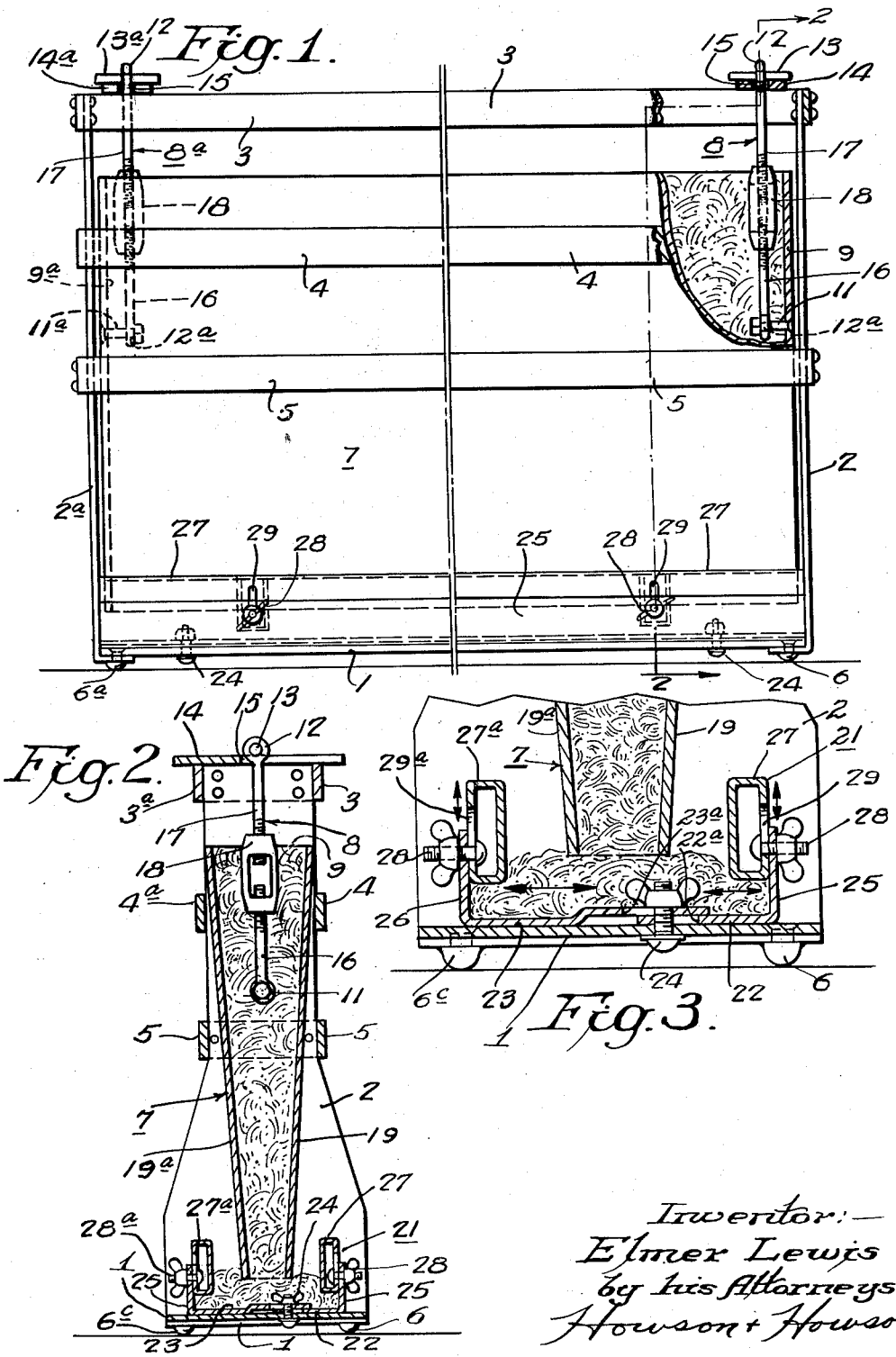
Inventor:—
Elmer Lewis
by his Attorneys
Howson & Howson March 6, 1951   E. LEWIS   2,543,916
POULTRY FEEDER
Filed Aug. 31, 1945   2 Sheets-Sheet 2
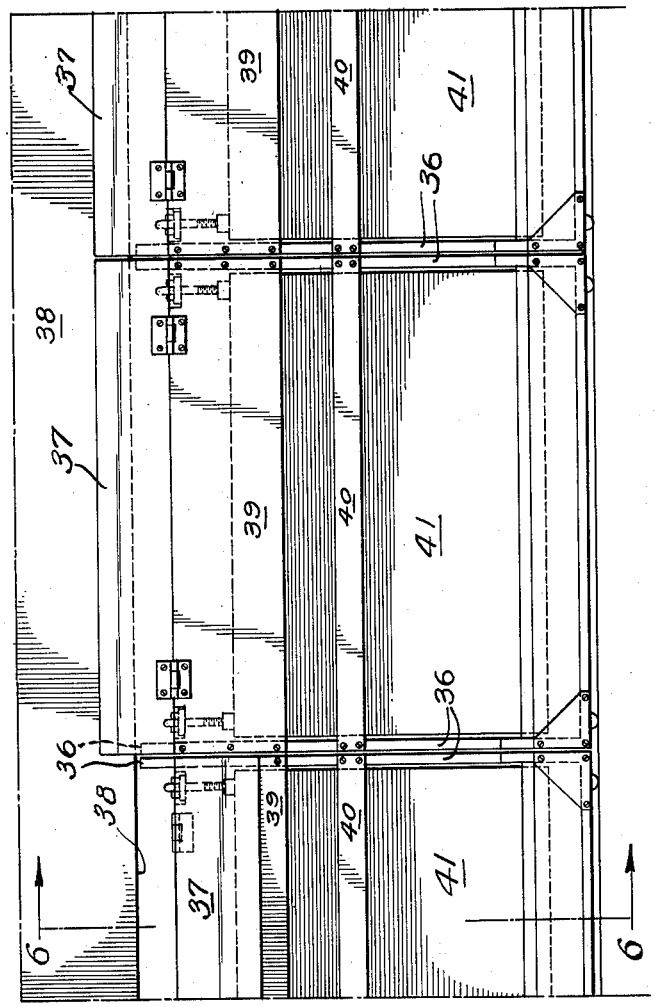
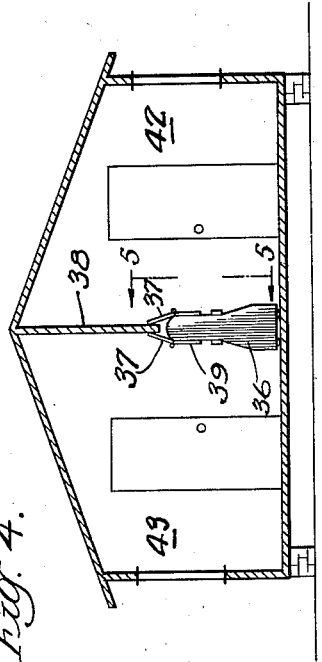
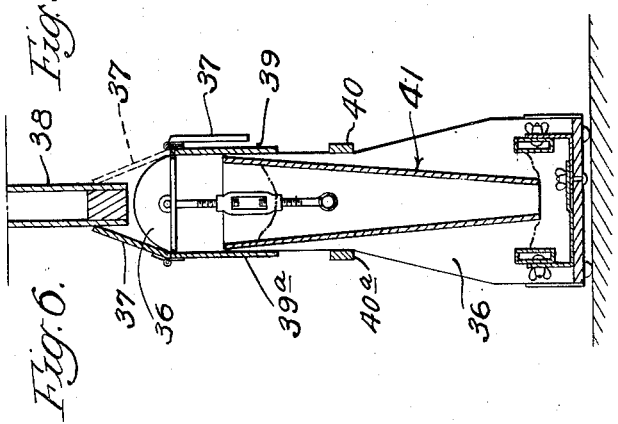
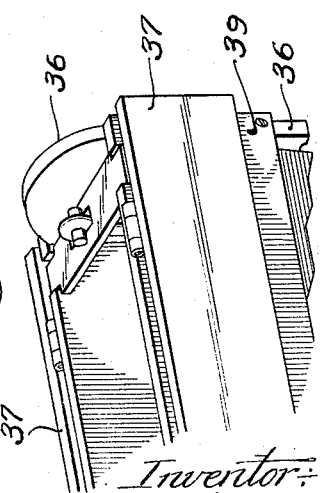
Inventor:
Elmer Lewis
by his Attorneys
Howson & Howson Patented Mar. 6, 1951

2,543,916

UNITED STATES PATENT OFFICE 2,543,916

POULTRY FEEDER

Elmer Lewis, Bristol, Pa.

Application August 31, 1945, Serial No. 613,912

2 Claims. (Cl. 119—53.5)

This invention relates to poultry feeders, and a principal object of the invention is to provide a feeder of the hopper type which will operate efficiently to deliver the feed to the poultry in predetermined quantities and at a predetermined rate, and which will exhibit improved free-running properties substantially free from interruptions due to bridging of the feed material in the hopper.

Another object of the invention is to provide a feeder adapted for use with similar units in a poultry house to afford an interior arrangement of highly desirable characteristics as hereinafter described.

The invention resides also in certain novel and advantageous structural features hereinafter described and illustrated in the attached drawings wherein:

Fig. 1 is a side view partly in section illustrating a feeder made in accordance with the invention;

Fig. 2 is a section on the line 2—2, Fig. 1;

Fig. 3 is an enlarged fragmentary sectional view illustrating certain of the structural details;

Fig. 4 is a transverse sectional view illustrating an installation of a modified form of feeder, made in accordance with my invention, in a poultry house;

Fig. 5 is a fragmentary side elevational view from the line 5—5, Fig. 4;

Fig. 6 is a sectional view on the line 6—6, Fig. 5; and

Fig. 7 is a fragmentary view in perspective of an end portion of one of the feeder units shown in Fig. 5.

With reference to the drawings, the embodiment of the invention illustrated in Figs. 1 to 3 inclusive, comprises a frame consisting essentially of a base 1, opposite end members 2, 2a extending upwardly from said base, a pair of cross bars 3, 3a which extend between the tops of the end members 2, 2a at opposite sides of the latter, and two additional sets of cross bars 4, 4a and 5, 5a which also extend between and unite the said end members 2 and 2a at spaced points intermediate the top and bottom of the frame, the several cross bars being secured to the end members by screws or other suitable fastening means. The aforedescribed members constitute the essential elements of a substantially rigid frame which is adapted to rest upon the floor or ground surface. In the present instance, four rounded elements 6, 6a, 6b and 6c are provided which support the base 1 of the frame in a slightly elevated position above the floor surface.

In accordance with the invention, a feed hopper 7 is suspended in the aforedescribed frame through the medium, in the present instance, of suspension rods 8, 8a. One each of these rods is pivotally connected to the end walls 9, 9a of the hopper by means of bolts or pins 11, 11a which project inwardly from said end walls and through an eye 12a in the bottom of the suspension rod. The upper end of each of the rods 8 and 8a also has an eyelet, as indicated at 12 in Fig. 2, and through each of these upper eyelets is passed a pin 13 and 13a respectively which rests upon a cross piece 14 and 14a respectively, these cross pieces being carried by the upper bars 3, 3a, and each having therein an aperture 15 through which the associated suspension rod 8 or 8a projects. Each of the rods 8 and 8a comprises two threaded elements 16 and 17 connected by a turnbuckle 18 so that the rods may be adjusted as to length. The hopper 7, in addition to the end walls 9, 9a, comprises side walls 19, 19a which converge toward the bottom of the hopper at angles to a vertical median plane through the center of the hopper of approximately 10° so that the included angle between the said side walls is approximately 20°.

The lower end of the hopper occupies a position within a trough 21 which rests upon the base plate 1 of the frame. This trough preferably is adjustable as to width and also as to the height of the walls, and to this end a construction may be employed as best illustrated in Fig. 3. In this case the trough consists of two longitudinal members 22 and 23 which are secured together by means of bolts 24, said bolts extending through transverse slots 22a and 23a in the said members 22 and 23, as shown, so as to provide for transverse adjustment of the members with respect to each other to increase or decrease the effective width of the trough. Each of the members 22 and 23 comprises at its outer longitudinal edge an upturned flange, 25 and 26 respectively, which flanges form elements of the side walls of the trough. To each of these flanges is secured a longitudinal member, 27 and 27a respectively, said member being secured to the flange by bolts 28 and 28a respectively. These bolts extend through slots 29 and 29a in the members 27 and 27a so as to provide for raising and lowering said member to thereby adjust the effective height of the side wall of the trough. The ends of the longitudinal members 22 and 23 and of the wall elements 27, 27a fit closely and slidably against the inner surfaces of the end members 2, 2a of the frame so that the frame in effect forms the ends of the adjustable trough.

The mode of operation of the feeder described above is as follows: The feed material is dumped into the open top of the hopper and tends to flow out from the bottom of the latter into the trough 21. The quantity of the feed which will enter the trough in the initial feeding operation will be determined by the distance of the lower end of the hopper from the bottom of the trough. Thus, when the quantity of feed in the trough rises to the point where it entirely closes the space between the lower end of the hopper and the bottom of the trough, the flow of the feed from the hopper will be automatically interrupted. As the feed is withdrawn by the poultry, additional quantities will pass downwardly from the hopper into the trough to maintain a constant supply in the latter. Particular attention is directed to the form of the hopper which has been found to possess marked free flowing characteristics and which lacks any pronounced tendency of the feed material to "bridge" or chain between the walls of the hopper in a manner to prevent the free passage of the feed material to the trough. It is to be noted further that the hopper is suspended in the frame in a manner which makes it highly susceptible to movement by even light pressures exerted at the lower end, this by reason of the fact that the pivot pins 11—11 are located close to but above the center of gravity of the hopper. It is to be noted also that the cross bars 4, 4a of the frame are positioned in proximity to the side walls of the hopper adjacent its upper end so that relatively slight displacement of the lower end of the hopper will bring the upper end thereof into contact with said cross bars. Such movement of the hopper, which may be effected by contact with the lower end thereof of the feeding poultry, and the slight jars occurring as a result of the contact of the upper end of the hopper with the cross bars 4, 4a will tend also to preclude stoppage by bridging of the normal flow of feed material to the trough.

In Figs. 4 to 7 inclusive, I have illustrated the use of a feeder unit, of the general type described above, as a movable partition means in poultry houses. In this case the feeder units are formed so that a plurality thereof may be placed end-to-end to form in effect a solid row or partition, and the cover elements are provided at the tops of the units for cooperation with a fixed partitioning element in the poultry house to complete the partition from the tops of the feeder units to the ceiling of the room.

With reference to Figs. 5, 6 and 7, the feeder units are essentially of the character described above, with the exception that they are made flat at the ends through the medium of end panels 36 the outer surfaces of which lie flush with the ends of the side members or cross bars 39, 39a and 40, 40a of the frame, so that when two or more of said units are placed end-to-end, as shown in Fig. 5, they may abut closely. Also, each of the units is provided at the top and at each side thereof with a hinged cover element 37 which may be folded upwardly as illustrated in Figs. 5 and 6 so as to engage opposite sides of a depending partitioning element 38, the function of which will be described hereinafter. It will be noted also that the longitudinal structure members 39, 39a which correspond to the elements 3 of the previously described embodiment have been increased in width so that they extend downwardly to a point below the top of the hopper 41. In other respects the individual feeder units may correspond substantially to those previously described in the preceding figures of the drawings.

In Figs. 4 and 5 I have shown a poultry house divided into two chambers 42 and 43 by intermediate partitions the lower portion of which is constituted by an end-to-end series of the above described feeder units, as shown in Fig. 5, and the upper portion of which is formed by the depending partition 38. The cover elements 37 when turned up against the opposite faces of the partition 38 form a joint closure for the space between the tops of the feeder units and the lower edge of partition 38. These cover elements 37 may, however, be lowered at will as indicated at the lefthand end of Fig. 6 and at the right side of Fig. 6 so as to permit the reloading of the hoppers 41. The depending side portions 39, 39a effectively close the spaces at the tops of the hopper elements so that the structure affords a substantialy solid partition precluding access of the fowl from one chamber to the other and providing ample feeding for the fowl in both chambers. It is to be noted also that the fowl are denied access to the tops of the feeding units for roosting and that the device provides a highly sanitary interior arrangement. By mounting the individual feeder units so that they may be readily moved from their normal positions, the feeder units may be displaced for cleaning the entire floor space, for painting or whitewashing, and for application of disinfectants.

I claim:

1. In a poultry feeder, a portable unit comprising a frame, a hopper suspended in said frame and having a bottom discharge opening, said frame having end members with flat outer faces adapting the unit for arrangement in contiguous end-to-end relation with other like units to form an extended substantially continuous feeder structure, a trough extending between said end members and embracing said opening, and closure means for the open top of the hopper, said closure means being movable between open and closed positions and being adapted in the said closed position to cooperate with a depending partition member disassociated from and overlying said units to effectively close the space between said uninterrupted feeder structure and the lower edge of said depending member.

2. A partition structure of the character described comprising an upper relatively fixed portion and a lower removable portion consisting of at least one portable poultry-feeding unit, said unit having an open-top hopper, and movable closure means for said open-top adapted in closed position to cooperate with the lower edge of the said upper portion of the partition to effectively close the space between the said upper portion and the top of the said unit.

ELMER LEWIS.

REFERENCES CITED

The following references are of record in the file of this patent:

UNITED STATES PATENTS

| Number | Name | Date |
| --- | --- | --- |
| 640,730 | Smith | Jan. 2, 1900 |
| 843,792 | Boyd | Feb. 12, 1907 |
| 1,316,910 | Mann | Sept. 23, 1919 |
| 1,463,862 | Wolf | Aug. 7, 1923 |
| 1,491,210 | Steinback | Apr. 22, 1924 |
| 1,527,653 | Katter | Feb. 24, 1925 |
| 1,673,101 | Burnett | June 12, 1928 |
| 1,715,493 | Clay | June 4, 1929 |
| 2,365,498 | Specketer | Dec. 19, 1944 |